(12) United States Patent
Koo et al.

(10) Patent No.: US 7,236,740 B2
(45) Date of Patent: Jun. 26, 2007

(54) DATA RETRANSMISSION APPARATUS AND METHOD IN A MOBILE COMMUNICATION SYSTEM EMPLOYING HARQ TECHNIQUE

(75) Inventors: Chang-Hoi Koo, Songnam-shi (KR); Kyou-Woong Kim, Suwon-shi (KR); Hwan-Joon Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 662 days.

(21) Appl. No.: 09/899,606

(22) Filed: Jul. 5, 2001

(65) Prior Publication Data
US 2002/0049068 A1 Apr. 25, 2002

(30) Foreign Application Priority Data
Jul. 5, 2000 (KR) .............................. 2000-39417

(51) Int. Cl.
*H09B 7/185* (2006.01)

(52) U.S. Cl. ...................... 455/13.4; 455/522; 455/69; 455/509; 455/86; 455/24; 455/70; 455/135; 455/136; 455/137; 370/348; 370/349; 714/704; 714/346

(58) Field of Classification Search ................ 370/348, 370/349; 714/748, 746, 704, 776, 749, 758, 714/752, 754; 455/510, 509, 522, 68, 69, 455/70, 71, 134, 135, 136, 137, 138, 139, 455/86, 13.4, 9, 24
See application file for complete search history.

(56) References Cited

U.S. PATENT DOCUMENTS

| | | | | |
|---|---|---|---|---|
| 5,801,639 A | * | 9/1998 | Dorenbosch et al. | ...... 340/7.23 |
| 6,021,124 A | | 2/2000 | Haartsen | |
| 6,760,877 B1 | * | 7/2004 | Lappetelainen et al. | .... 714/748 |
| 2001/0056560 A1 | * | 12/2001 | Khan et al. | ................ 714/746 |

* cited by examiner

*Primary Examiner*—Matthew Anderson
*Assistant Examiner*—Shaima Q. Aminzay
(74) *Attorney, Agent, or Firm*—The Farrell Law Firm

(57) ABSTRACT

A method and apparatus for retransmitting data in a mobile communication system wherein a receiver determines whether an initial data block received from a transmitter has an error. Upon detecting an error from the initial data block, the receiver estimates a current channel state and determines a retransmission frequency and a power level of the initial data block according to the estimated current channel state. Thereafter, the receiver transmits a retransmission request message of the initial data block together with the determined retransmission frequency and the determined power level to the transmitter. The transmitter retransmits the initial data block as many times as the retransmission frequency at the requested power level. The receiver then determines whether the retransmitted data blocks have errors, and provides the retransmitted data blocks to an upper layer upon failure to detect errors from the retransmitted data blocks.

10 Claims, 6 Drawing Sheets

DATA RETRANSMISSION APPARATUS AND METHOD IN A MOBILE COMMUNICATION SYSTEM EMPLOYING HARQ TECHNIQUE

PRIORITY

This application claims priority to an application entitled "Data Retransmission Apparatus and Method in a Mobile communication System Employing HARQ Technique" filed in the Korean Industrial Property Office on Jul. 5, 2000 and assigned Serial No. 2000-39417, the contents of which are hereby incorporated by reference.

BACKGROUND OF THE INVENTION

1. Field of the Invention

The present invention relates generally to a data transmission apparatus and method in a mobile communication system, and in particular, to an apparatus and method for retransmitting data having a transmission error.

2. Description of the Related Art

Mobile communication systems chiefly use linear block codes such as convolutional codes stand turbo codes, for channel coding, Such a mobile communication system employs an HARQ (Hybrid Automatic Repeat (or Retransmission) reQuest) scheme, which requests retransmission of data packets upon detection of an FEC (Forward Error Correction) code and an error.

A mobile communication system employs the HARQ scheme to increase data transmission efficiency, i.e. throughput and improve system performance using a channel coding scheme. The mobile communication system generally refers to a satellite system, an ISDN (Integrated Services Digital Network) system, a digital cellular system, a CDMA-2000 (Code Division Multiple Access-2000) system, a UMTS (Universal Mobile Telecommunication System) system and an IMT-2000 (International Mobile Telecommunication-2000) system. Further, the convolutional codes and the turbo codes are used for the FEC code.

Operation of the general HARQ scheme will be described below with reference to FIGS. 1 to 3.

FIG. 1 illustrates a packet retransmission process in the general HARQ scheme. Referring to FIG. 1 a receiver RX receives initial packet data transmitted from a transmitter TX (Step 101). The receiver determines whether an error has occurred in the received initial packet data. Upon detecting an error from the initial packet data, the receiver transmits a retransmission request message NAK Negative Acknowledgement) with only packet ID (identification) information including a version number and a sequence number to the transmitter (Step 102). It is possible for the receiver to report information on the retransmission-requested packet data to the transmitter by transmitting the retransmission request message NAK with the packet H) information including a version number and a sequence number. Although now shown in FIG. 1, for the error-fee packet data received, the receiver transmits an ACK (Acknowledgement) signal with the packet ID information, Upon receipt of the retransmission request message NAK, the transmitter transmits the retransmission-requested packet data (Step 103) Upon receipt of the packet data retransmitted from the transmitter, the receiver determines again whether an error has been detected from the retransmitted packet data and upon detecting an error, repeats the above-stated process (Steps 104 and 105). However, if no error has been detected from the retransmitted packet data, the receiver transmits an ACK signal with the packet ID information including a version number and a sequence number to the transmitter (Step 106).

As described above, the conventional HARQ scheme repeats the packet retransmission process until the receiver transmits an ACK signal after successful decoding, or repeats the packet retransmission process predetermined times. Here, the "predetermined times" refers to a possible retransmission frequency of the same packet data, specified in the HARQ scheme. When the HARQ scheme continuously detects an error from the transmission data, i.e., when the channel environment is bad, a time period $t_1-t_0$ required in transmitting the same packet data is increased drastically decreasing the overall troughput. Although FIG. 1 shows only the process for retransmitting the packet data having a transmission error, the HARQ scheme actually operates in a Selective-Repeat ARQ mode, so that the transmitter continuously transmits the packet data no matter whether the packet data has a transmission error. Therefore, upon receipt of the packet ID information, i.e., a version number and a sequence number, of the erroneous packet data from the receiver, the transmitter repeats the process for retransmitting only the packet data having a transmission error.

FIG. 2 illustrates a process for receiving packet data in the receiver employing the general HARQ technique. In particular, FIG. 2 illustrates a process for receiving packet data in the case where the receiver sends the retransmission request message only once regardless of the channel environment upon detecting an error from the initial packet data. In the packet data receiving method show in FIG. 2, the receiver sends the retransmission request message in the same method regardless of the channel environment, i.e., regardless of a probability that an error will occur during retransmission of the packet data.

Referring to FIG. 2, upon receipt of initial packet data in step 201, the receiver determines in step 202 whether a transmission error has occurred in the received initial packet data. If the initial packet data has an error, the receiver proceeds to step 204. Otherwise, if the initial packet data has no error, the receiver proceeds to step 203. In step 203, the receiver transmits the error-free initial packet data to an upper layer and then ends the process. In step 204, the receiver transmits to the transmitter a retransmission request message NAK including the packet ID information including a version number and a sequence number in order to request retransmission of the initial packet data having an error. Thereafter, in step 205, the receiver receives the packet data retransmitted from the transmitter in response to the retransmission request message NAK, In step 206, the receiver determines again whether an error has occurs in the received retransmitted packet data. If an error is detected from the received retransmitted packet data, the receiver returns to step 204 and then performs again the above-stated operation Otherwise, if no error is detected from the received retransmitted packet data, the receiver provides the received retransmitted packet data to the upper layer in step 203 and then ends the process.

FIG. 3 illustrates a packet data combining process in the receiver employing the general HARQ technique. In particular, FIG. 3 illustrates a process for performing decoding by simply (or unconditionally) combining the received retransmitted packet data with the first received packet data regardless of the channel environment in the receiver employing the general HARQ technique. In the packet data combining process shown in FIG. 3, the receiver simply combines the received retransmitted packet data with the initial packet data, with no thought of the possibility that the received retransmitted packet data may have a bad influence on the decoding operation. This process is applied only to HARQ Type II and HARQ Type III, but not applied to HARQ Type I, which does not support the data combining technique.

In general, the HARQ scheme is divided into HARQ Type I, HARQ Type II and HARQ Type III. The HARQ Type I uses a constant redundancy, i.e., a constant data rate in both the initial transmission process and the retransmission process. The transmitter combines transmission data with a CRC (Cyclic Redundancy Check) code for error connection and then encodes the CRC-combined transmission data through channel encoding. Further, the transmitter transmits the encoded data through an assigned channel. The receiver then acquires the original data and the CRC in the reverse operation of the transmitter. The receiver transmits a response signal ACK or NAK to the transmitter according to the CRC check results. If no error is detected from the initial packet data, the receiver provides the received initial data to the upper layer, However, upon detecting an error, the receiver sends a retransmission request message NAK to the transmitter. The transmitter then retransmits the previously transmitted encoded data block upon receipt of the retransmission request message NAK.

However, the HARQ Type I has the following disadvantages. First, the HARQ Type I has higher throughput, compared with a pure ARQ scheme. However, as a signal-to-noise ratio (S/N) of a signal is increased more and more, the throughput becomes saturated to a code rate R of the FEC code, thus resulting in a reduction in the throughput ay compared with the pure ARQ. That is, the throughput cannot approach 1.0 (100%), but is saturated to the code rate R (<1.0) even at a very high S/N.

Second, the HARQ Type I improves the throughput by performing error correction using the FEC code, compared with the pure ARQ. However, since the HARQ Type I uses a constant redundancy, i.e., constant code rate regardless of variation in S/N. It has low transmission efficiency, Therefore, the HARQ Type I cannot adaptively cope with variations in the channel environment, thus causing a decrease in the data rate.

To solve the problems of the HARQ Type I the HARQ Type II and the HARQ Type III are used. The HARQ Type II and the HARQ Type III have an adaptive structure that adaptively determines an amount of redundancies used for the FEC code according to the channel environment. Therefore, the HARQ type II and the HARQ Type III have improved throughput compared with the HARQ Type I. That is, the adaptive structure reduces the amount of redundancies to a minimum, so that as the S/N of the signal is increased more and more, the code rate R of the FEC code approaches 1, thereby enabling the throughput to approach to 1. However, the adaptive structure increases the amount of redundancies or repeats the redundancies as much as possible, so that if the S/N of the signal is decreased, the code rate R of the FEC code approaches 0, thereby enabling the throughput not to approach to 0. Accordingly, the HARQ Type II and the HARQ Type III have improved throughput at both a low S/N and a high S/N.

A difference between the HARQ Type II and the HARQ Type III will be described below.

The HARQ type a transmits a data block with a code rate R1 set to a value equal to or less than '1' during initial transmission, and transmits only the redundancies whose code rate is less than '1' during retransmissions. Therefore, it is not possible to perform decoding with only the secondarily and thirdly transmitted redundancies, so that it is necessary to perform decoding by combining them with the previously transmitted data block (or redundancies).

On the other hand, the HARQ Type III transmits information on the data block even for the secondarily and thirdly transmitted redundancies using a complementary code. The HARQ Type III makes up for shortcoming of the HARQ Type II by making it possible to perform decoding during every transmission. In general, however, the HARQ Type III has lower throughput compared with the HARQ Type II in the good channel environment With regard to the HARQ scheme, the W-CDMA mobile communication system has the following disadvantages, First, upon detesting an error from the initial packet data, the receiver transmits the version number and the sequence number of the retransmission-requested packet data, thus causing a decrease in efficiency of the retransmission request. That is, even in the worst channel environment the receiver sends the retransmission request message only once, with no thought of the possibility that an error may occur again in the packet data to be retransmitted.

Second, in the process of decoding the received retransmitted packet data, the receiver unconditionally combines the first received packet data with the received retransmitted packet data regardless of the channel environment during retransmission so that the received retransmitted packet data may have a bad influence on the decoding operation.

SUMMARY OF THE INVENTION

It is, therefore, an object of the present invention to provide a data retransmission apparatus and method with increased retransmission efficiency in a mobile communication system.

It is another object of the present invention to provide a data retransmission apparatus and method for securing an efficient combination between first received data and retransmitted data in a mobile communication system.

It is further another object of the present invention to provide a data retransmission apparatus and method for transmitting a retransmission request message wit packet retransmission frequency and transmission power level information thereby to retransmit data in consideration of a channel environment in a mobile communication system.

It is yet another object of the present invention to provide a data retransmission apparatus and method for applying a combining technique to the HARQ Type I in a mobile communication system.

It is still another object of the present invention to provide a data retransmission apparatus and method for securing efficient decoding by performing data combining according to a power level of retransmitted packet data in a mobile communication system.

To achieve the above and other objects, there is provided a method for retransmitting data in a mobile communication system. A receiver determines whether an initial data block received from a transmitter has an error Upon detecting an error from the initial data block, the receiver estimates a current channel state and determines a retransmission frequency and a power level of the initial data block according to the estimated current channel state. Thereafter, the receiver transmits a retransmission request message of the initial data block together with the determined retransmission frequency and the determined power level to the transmitter. In response to the retransmission request message, the transmitter retransmits the initial data block as many times as the retransmission frequency at the requested power level. The receiver then determines whether the retransmitted data blocks have errors, and provides the retransmitted data blocks to an upper layer upon failure to detect errors from the retransmitted data blocks. However, upon failure to detect errors, the receiver measures an average power level of the initial data block and each of the retransmitted data blocks, and selectively combines only the data blocks having an average power level higher than or equal to a predetermined reference power level. Further, the receiver discards the data blocks having an average power level lower than the reference power level.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides two proposed data retransmission methods as follows.

A first method is to transmit a retransmission request message NAK including side information as well as the packet ID information, for efficient data retransmission. The existing retransmission request message NAK includes only the packet ID information including a version number and a sequence number, whereas it retransmission request message NAK proposed by the invention includes information on a packet retransmission frequency of concerned packet data and information on a power level for transmitting the packet data, as well as the packet ID information including the version number and the sequence number, thereby making it possible to adaptively retransmit the packet data according variations in the channel environment. The packet retransmission frequency information is used when the receiver requests the transmitter to retransmit the retransmission-requested packet data in the predetermined times. The power level information is used when the receiver requests the transmitter to retransmit the retransmission-requested packet data at a predetermined power level in consideration of the channel environment.

A second method is to apply the combining technique even to the HARQ Type I that does not currently employ the combining technique. The existing HARQ scheme performs decoding by simply combining the received retransmitted packet data with the first received packet data, whereas the combining technique proposed by the invention measures a power level of the received retransmitted packet data to determine whether to reflect or discard the received retransmitted packet data in the decoding process. By doing so, it is possible to discard the received retransmitted packet data having an error, which may have a bad influence on the decoding operation, thereby securing efficient decoding.

A packet data retransmission method according to an embodiment of the present invention will now be described with reference to FIGS. 4 to 6.

Figure 4:
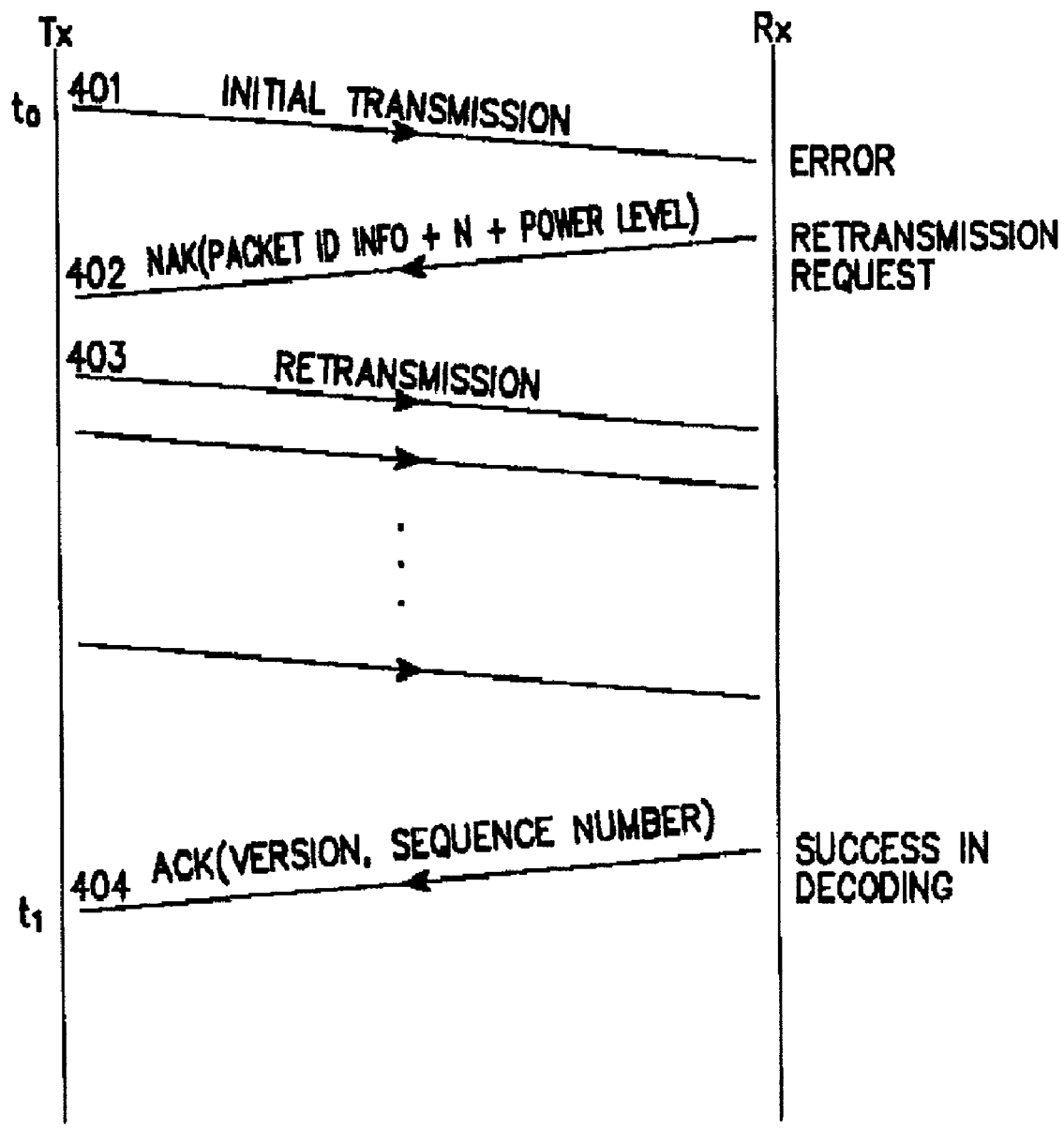
FIG. 4 is a flow diagram illustrating a process for retransmitting packet data in an HARQ scheme according to an embodiment of the present invention.

FIG. 4 illustrates a process for retransmitting packet data in an HARQ scheme according to an embodiment of the present invention. Referring to FIG. 4, if the received packet data has an error, the receiver transmits information on a packet retransmission frequency and a power level required for the erroneous packet data according to the channel condition, as well as the packet ID information (inluding a version number and a sequence number) of the received packet data. That is, FIG. 4 discloses a packet retransmission request process in the HARQ scheme, for securing efficient packet retransmission according to the channel environment.

Figure 5:
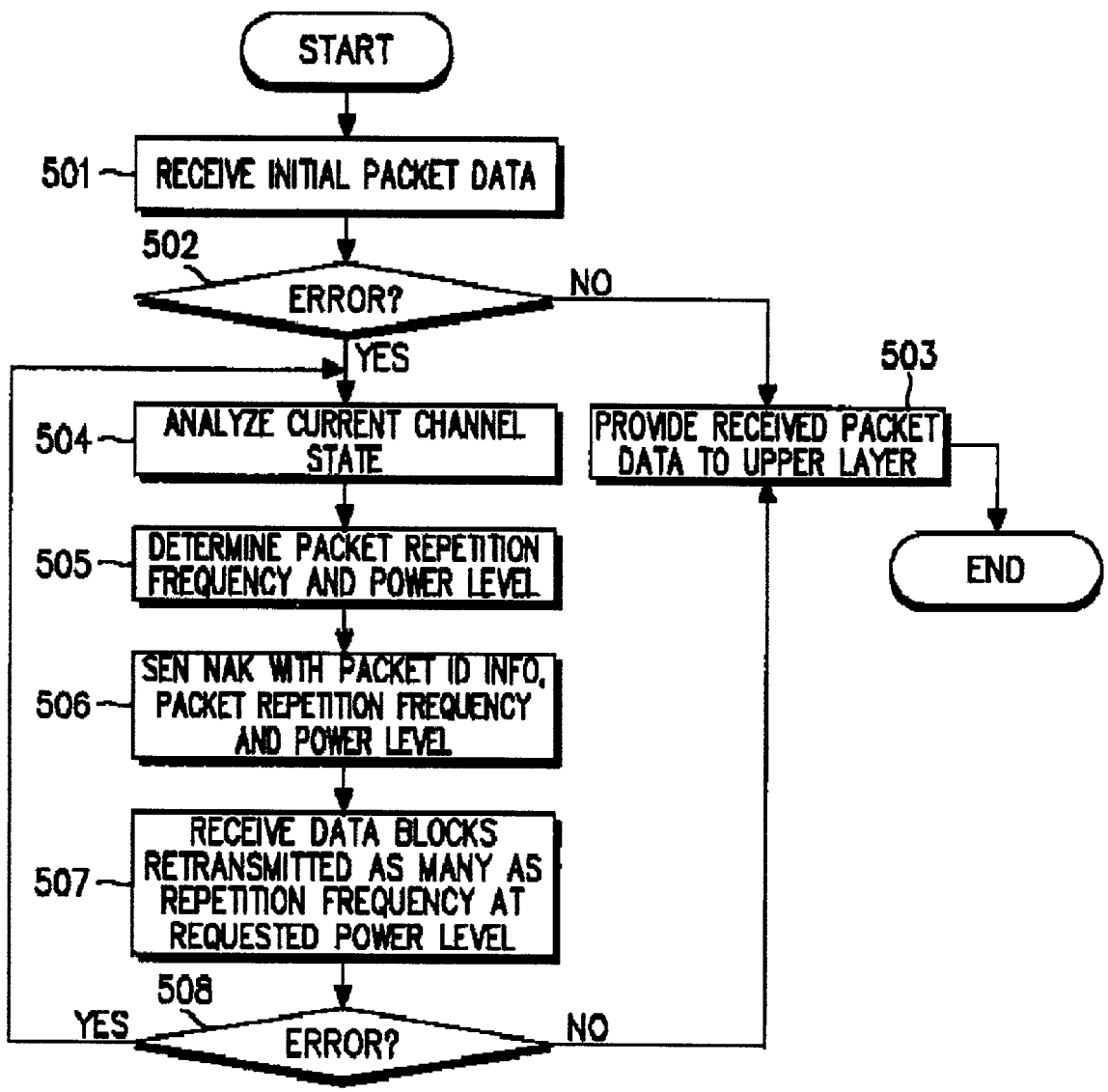
FIG. 5 is a flow chart illustrating a process for receiving packet data in a receiver employing an HARQ technique according to an embodiment of the present invention.

FIG. 5 illustrates a process for receiving packet data in a receiver employing an HARQ technique according to an embodiment of the present invention. In particular, the receiver sends a retransmission request message in consideration of the channel condition of the packet data having an error, thereby securing efficient packet data retransmission.

Figure 6:
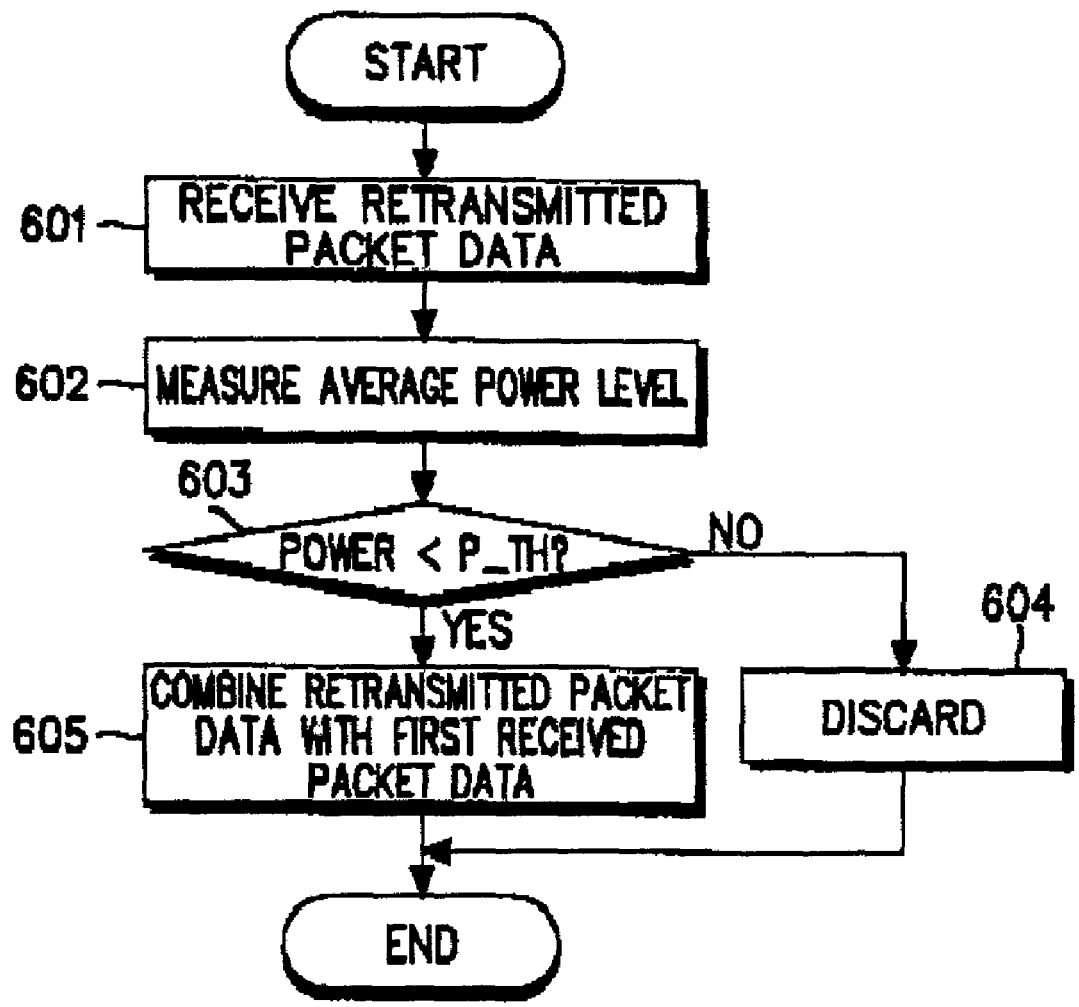
FIG. 6 is a flow chart illustrating a process for combining packet data in the receiver employing the HARQ technique according to an embodiment of the present invention.

FIG. 6 illustrates a process for combining packet data in the receiver employing the HARQ technique according to an embodiment of the present invention. In this process, the receiver measures an average power level of each packet data block received in the process of decoding the received retransmitted packet data blocks, compares the measured average power levels with a threshold value P_TH indicating a reference power level, and determines whether to combine (including soft combining) the received retransmitted packet data blocks with the first received packet data block. That is, the proposed combining technique can secure efficient decoding by discarding the retransmitted packet data blocks having errors, received in the bad channel environment, which may have a bad influence on the decoding operation.

The embodiment of the present invention will be described below with reference to FIGS. 4 to 6. The description of the embodiment will be made separately regarding (1) a packet data retransmission request process, (2) a packet data receiving process and (3) a packet data combining process in the HARQ scheme.

(1) Packet Data Retransmission Request Operation

In step 401 of FIG. 4, the transmitter transmits initial packet data (block) to the receiver. The receiver determines whether the initial packet data received from the transmitter has an error. If an error is detected from the initial packet data, the receiver sends to the transmitter a retransmission request message NAK including packet retransmission frequency information and power level information as well as the packet ID information (including a version number and a sequence number) of the initial packet data, in step 402. Here, the information on the packet retransmission frequency N is transmitted in order to request the transmitter to retransmit the erroneous packet data N times. Further, the receiver transmits the power level information in consideration of the channel environment in order to request the transmitter to retransmit the packet data at the power level.

Upon receipt of the retransmission request message NAK, the transmitter analyzes the packet retransmission frequency information and the power level information as well as the packet ID information (including a version number and a sequence number), included in the received retransmission request message NAK. After completion of analyzing the retransmission request message NAK, the transmitter retransmits N packet data blocks (or retransmits the same packet data block N times), which were analyzed to be transmitted, to the receiver in step 403. Upon receipt of the retransmitted packet data blocks, the receiver determines whether the received retransmitted packet date blocks have errors. If no error is detected the receiver performs decoding on the received retransmitted packet data blocks. After successfully completing the decoding, the receiver transmits an ACK signal to the transmitter in step 404, completing transmission of the corresponding packet data, i.e., the initial packet data. The receiver transmits the ACK signal with the packet ID information including the version number and the sequence number.

Figure 1:
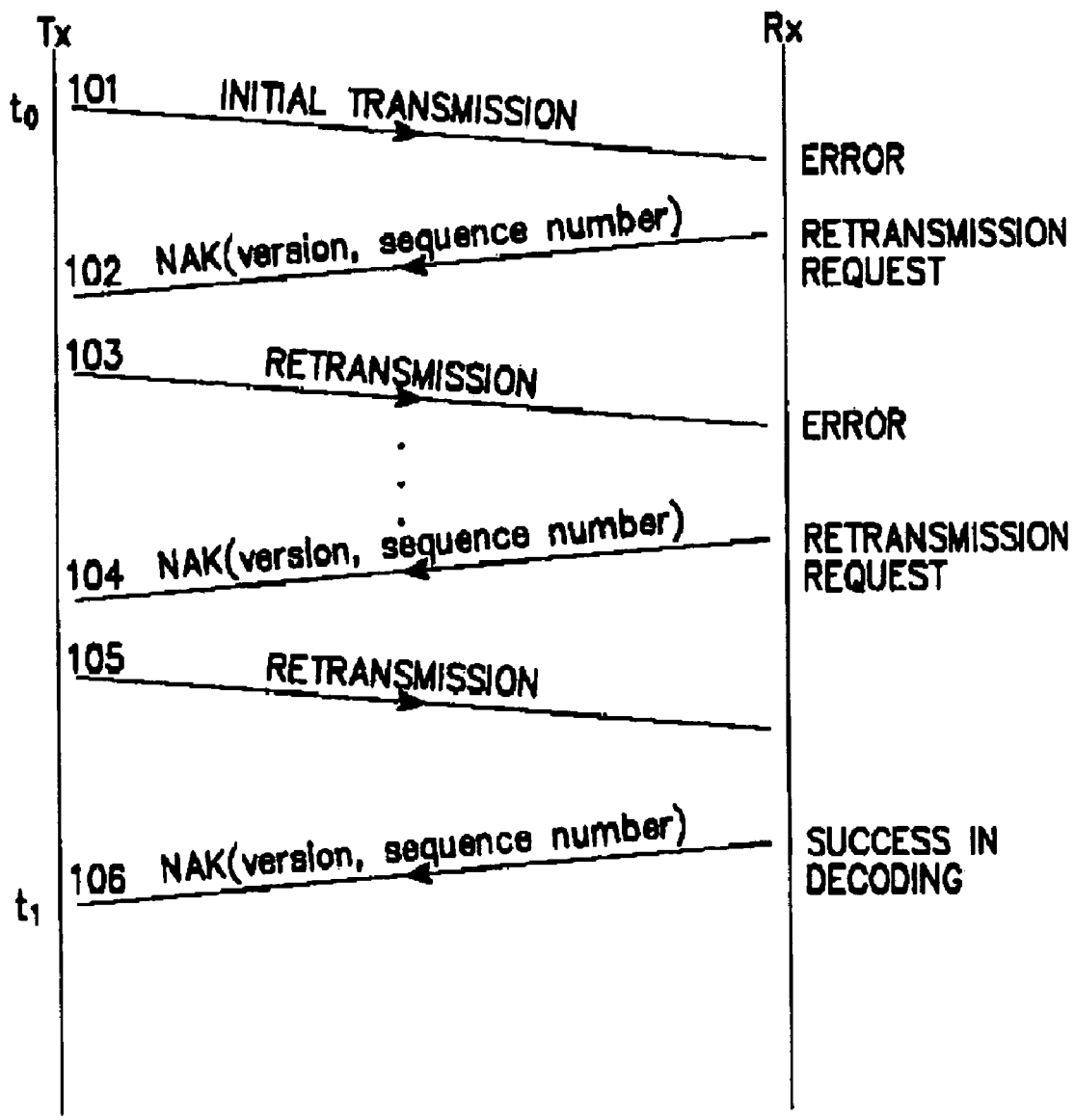
FIG. 1 is a flow diagram illustrating a packet retransmission process in a general HARQ scheme.
Figure 2:
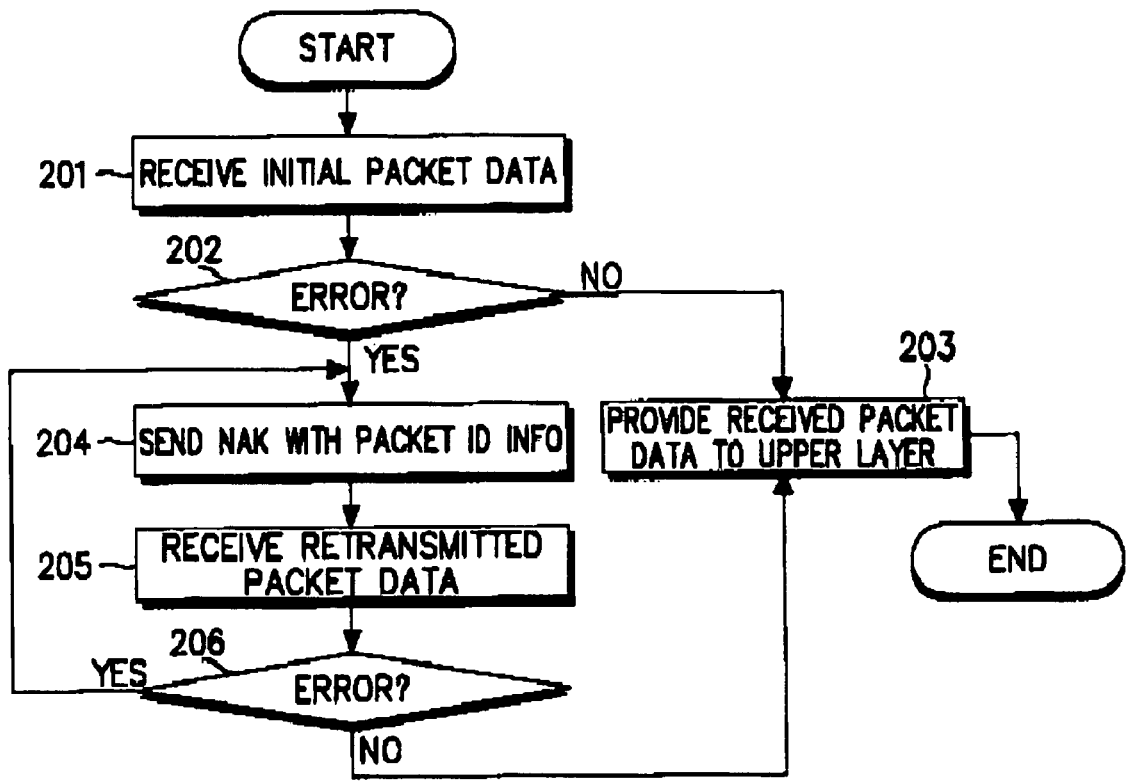
FIG. 2 is a flow chart illustrating a process for receiving packet data in a receiver employing the general HARQ technique.
Figure 3:
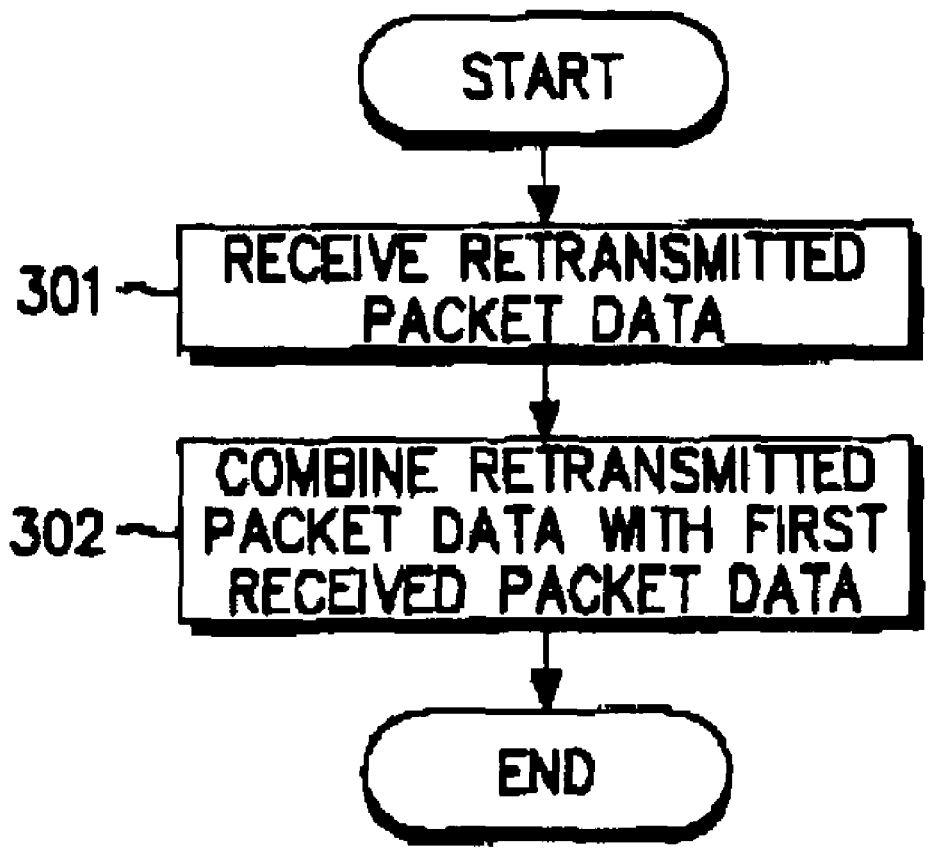
FIG. 3 is a flow chart illustrating a process for combining packet data in the receiver employing the general HARQ technique.

It is noted that the novel packet data retransmission method shown in FIG. 4 has improved retransmission performance compared with the conventional packet data retransmission method shown in FIG. 1. The time required in transmitting the initial (source) packet data becomes $t_1-t_0$ as shown in FIGS. 1 and 4. If the retransmission request message is repeated over twice increasing the retransmission request frequency, a difference between the time required in the conventional retransmission method and the time required in the novel retransmission method will be increased. For example, if the retransmission request message is repeated 5 times, the conventional retransmission method requires 5 times the unit round trip time plus 5 times the unit packet processing time, whereas the novel retransmission method requires a time necessary for transmitting 5 packets plus the unit round trip time plus the unit packet processing time. Therefore, a difference of the initial (source) packet data transmission time between the conventional retransmission method and the novel retransmission method is considerable, and the difference increases if the channel environment becomes worse. The retransmission method of FIG. 4 is a Selective-Repeat ARQ method. Though not illustrated in FIG. 4, the transmitter continuously transmits the packet data no matter whether the transmitted packet data has an error, and the receiver transmits to the transmitter the retransmission request message NAK with the packet ID information, the packet retransmission frequency information and the power level information of the packet data having an error. Upon receipt of the retransmission request message NAK for the erroneous packet data from the receiver, the transmitter retransmits the re-transmission-requested packet data as many times as the packet retransmission frequency at the power level, as specified in the retransmission request message NAK. However, the receiver transmits an ACK signal including the packet ID information with regard to the error-free packet data.

(2) Packet Data Receiving Operation

Upon receipt of the initial packet data tom the transmitter in step 501 of FIG. 5, the receiver determines in step 502 whether the received initial packet data has an error, by performing CRC check after channel decoding. If no error is detected from the initial packet data, the receiver provides the channel-decoded initial packet data to an upper layer in step 503.

However, if an error is detected from the initial packet data, the receiver analyzes the current channel condition by estimating the channel over which the initial packet data is received, in step 504. Based on the analyzed channel state, the receiver determines the packet retransmission frequency and the power level, required by the transmitter in retransmitting the packet data, in step 505. Here, the retransmission frequency and the power level are determined depending on a state of the uplink channel established between a UTRAN (UMTS Terrestrial Radio Access Network) and a UE (User Equipment).

In the HARQ Type I, the "packet retransmission frequency" indicates how many times the transmitter will repeatedly transmit the same packet data as that transmitted during the initial transmission. Further, in the HARQ Type II and the HARQ Type II the "packet retransmission frequency" indicates the frequency of requesting the transmitter to transmit a sequence of redundancies at the same time according to a predetermined retransmission scenario. Here, the "retransmission scenario" refers to defining how many times the transmitter will retransmit the redundancies, defining the size of a data block for each retransmission and defining a code rate at which the transmitter will retransmit the data block. If the retransmission frequency is exceeded, the transmitter retransmits information including the data block transmitted during initial transmission as many times as the requested retransmission frequency. For example, let's assume that when the retransmission scenario is set to transmit the packet data three times, the first transmitted packet data is represented by P1, the second transmitted packet data is represented by P2 and the third transmitted packet data is represented by P3. The receiver transmits the packet retransmission frequency of 4 according to the deteriorated channel environment because an error is detected in the decoding process after receiving the P1 during initial transmission. In this case, P2, P3, P1 and P2 are transmitted in sequence during retransmission. Further, the power level at which the packet data is to be retransmitted by the transmitter, is determined based on the channel environment.

After determining the packet retransmission frequency and the power level, the receiver transmits to the transmitter the retransmission request message NAK together with the determined packet retransmission frequency and the determined power level as well as the packet ID information including the version number and the sequence number, in step 506 After transmitting the retransmission request message NAK, the receiver receives the packet data blocks retransmitted from the transmitted in response to the retransmission request message NAK, in step 507. At this point, the receiver receives the packet data blocks that the transmitter has retransmitted as many times as the requested packet retransmission frequency it the requested power level, as specified in the retransmission request message NAK. Although the transmitter retransmits the packet data blocks at the power level requested by the receiver, the actual receiving power level may be different from the requested power level according to the channel condition. After receiving the retransmitted packet data blocks, the receiver determines in step 508 whether the received retransmitted packet data blocks have errors, by performing CRC check. If no error is detected from the retransmitted packet data blocks, the receiver provides the received retransmitted packet data blocks to the upper layer in step 503, and then ends the process. However, if an error is detected from the retransmitted packet data blocks, the receiver repeatedly performs the above-stated process of steps 504 to 508.

(3) Packet Data Combining Operation

In step 601 of FIG. 6, the receiver receives the packet data blocks retransmitted from the transmitter. The operation of step 601 corresponds to the operation of step 507 of FIG. 5. That is, the receiver receives the packet data blocks that the transmitter has retransmitted as many times as the requested packet retransmission frequency at the requested power level as specified in the retransmission request message NAK. In step 602, the receiver measures an average power level of each of the received retransmitted packet data block. Thereafter, in step 603, the receiver compares the measured average power levels of the retransmitted packet data blocks with a threshold value P_TH indicating a reference power level to determine whether to perform combining on the received retransmitted packet data blocks. Here, the reason for determining whether to perform combining by comparing the average power level of each of the received retransmitted packet data blocks with the reference power level is to disregard the retransmitted packet data block received at a power level lower than the reference power level in the combining process, because when the receiving power level of the retransmitted packet data block is lower than the reference power level, the retransmitted packet data block may have a bad influence on the combining operation during decoding. By doing so, it is possible to increase the retransmission efficiency.

If the average power level of the retransmitted packet data block is lower than the threshold value P_TH in step 603, the receiver discards the retransmitted packet data block having an average power level lower than the reference power level in step 604. However, if the average power level of each of the retransmitted packet data blocks is higher than or equal to the threshold value P_TH, the receiver performs decoding by combining only the retransmitted packet data blocks having an average power level lower than or equal to the threshold value P_TH in step 605, and then ends the process. Here, combining the retransmitted packet data blocks with the initial packet data block is performed only when the average power level of the initial packet data block is higher than or equal to the reference power level, because when the average power level of the initial packet data is lower than the reference power level, the initial packet data block may affect the decoding operation.

The threshold value P_TH becomes a criterion for determining whether to apply the retransmitted packet data block to a combining operation in the decoding process. That is, the threshold value P_TH is an estimation value determined by accumulating the power level of each retransmitted packet data block having an error in consideration of the current channel condition and averaging the accumulated power level, to estimate an error occurrence probability, and becomes a criterion for determining usability of the retransmitted packet data block.

To sum up, the conventional retransmission method does not apply the combining technique to the HARQ Type I, whereas the novel retransmission method applies the soft-combining technique to the HARQ Type I. Therefore, it is possible to increase decoding success probability by performing soft combining on the packet data blocks having an average power level higher than the threshold value P_TH, out of N same retransmitted packet data blocks received in the HARQ Type I mode. In the HARQ Type II and the HARQ Type III, the second, third, . . . redundancies within one cycle, received in sequence in the process of decoding the received retransmitted packet data are combined with the initially received packet data for decoding. Further, when the same packets are repeated exceeding one cycle, they are subjected to soft combining for decoding.

As described above, the W-CDMA mobile communication system according to the present invention efficiently retransmits the packet data and efficiently combines the received retransmitted packet data with the first received packet data, thereby increasing retransmission efficiency. In addition, upon failure to correct an error occurred in the received packet data, the HARQ scheme of the mobile communication system transmits the retransmission request message with the packet retransmission frequency information and the power level information, thereby securing efficient retransmission according to the channel environment. In addition, the HARQ scheme measures a power level of the received retransmitted packet data to determine whether to combine it with the first received packet data, in order to perform decoding after discarding the retransmitted packet data having errors which may affect the decoding operations thereby securing efficient decoding.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for retransmitting data in a mobile communication system, comprising the steps of:
   determining whether an initial data block received from a transmitter has an error;
   estimating a current channel state and determining a retransmission frequency according to the estimated current channel state upon detecting an error in the initial data block;
   transmitting a retransmission request message of the initial data block together with the determined retransmission frequency to the transmitter;
   receiving data blocks retransmitted by the transmitter as many times as the retransmission frequency in response to the retransmission request message;
   determining whether the retransmitted data blocks have errors; and
   providing the received data blocks to an upper layer upon failure to detect errors from the received data blocks;
   measuring an average received power level of the initial data block and each of the received data blocks, and selectively combining only the data blocks having an average power level higher than or equal to a predetermined reference power level upon failure to detect errors.

2. The method as claimed in claim 1, further comprising the step of discarding the data blocks having an average power level lower than the reference power level.

3. A method for retransmitting data in a mobile communication system, comprising the steps of:
   receiving a plurality of data blocks retransmitted due to an error occurring in an initial data block;
   measuring an average received power level of each retransmitted data block;
   comparing the average received power levels with a predetermined reference power level; and
   combining the received data blocks having an average power level higher than or equal to the reference power level.

4. A method for retransmitting data in a mobile communication system, comprising the steps of:
estimating a current channel state, determining a retransmission frequency according to the estimated channel state, and transmitting a retransmission request message with the determined retransmission frequency, the version number and the sequence number upon detecting an error in a received initial data block;
receiving data blocks retransmitted as many times as the retransmission frequency in response to the retransmission request message;
measuring an average power level of each received data block;
comparing the average power levels with a predetermined reference power level; and
combining the received data blocks having an average power level higher than or equal to the reference power level.

5. A method for retransmitting data in a mobile communication system, comprising the steps of:
estimating a current channel state and transmitting a retransmission request message with retransmission frequency information to a transmitter according to the estimated channel state upon a receiver's detecting an error in an initial data block;
retransmitting the initial data block to the receiver as many times as the retransmission frequency at the power level specified in the retransmission request message upon the transmitter's receipt of the retransmission request message;
measuring, in the receiver, an average power level of said each received data blocks; and
selectively combining only the data blocks having an average power level higher than or equal to a predetermined reference power level, out of the retransmitted data blocks and the initial data block.

6. The method as claimed in claim 5, wherein the retransmission request message includes the retransmission frequency information, the power level information and packet ID (identification) information.

7. The method as claimed in claim 5, wherein the receiver provides the received data blocks to an upper layer, if no error is detected from the received data blocks.

8. An apparatus for retransmitting data in a mobile communication system, comprising:
a receiver for (A) estimating a current channel state, (B) transmitting a retransmission request message for the initial data block, together with retransmission frequency information according to the estimated channel state, (C) measuring an average power level of each data block received in response to the retransmission request message, and (D) combining only the data blocks having an average power level higher than or equal to a predetermined reference power level, out of the initial data block and the retransmitted data blocks; and
a transmitter for retransmitting the initial data block as many times as the retransmission frequency in response to the retransmission request message from the receiver.

9. The apparatus as claimed in claim 8, wherein the receiver discards the data blocks having an average power level lower than the reference power level.

10. The apparatus as claimed in claim 8, wherein the retransmission request message includes the retransmission frequency information and packet ID information.

* * * * *